(12) United States Patent
Miao

(10) Patent No.: US 8,311,201 B2
(45) Date of Patent: Nov. 13, 2012

(54) METHOD AND SYSTEM FOR CONTROLLING A CONFERENCE

(75) Inventor: Caixia Miao, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 454 days.

(21) Appl. No.: 12/488,148

(22) Filed: Jun. 19, 2009

(65) Prior Publication Data

US 2009/0285374 A1    Nov. 19, 2009

Related U.S. Application Data

(63) Continuation of application No. PCT/CN2007/070838, filed on Sep. 29, 2007.

(30) Foreign Application Priority Data

Dec. 19, 2006    (CN) .......................... 2006 1 0161750

(51) Int. Cl.
H04M 3/42    (2006.01)
(52) U.S. Cl. ............ 379/204.01; 379/93.21; 379/206.01
(58) Field of Classification Search ......................... 379/202.01–206.01, 93.21
See application file for complete search history.

(56) References Cited

U.S. PATENT DOCUMENTS

| | | | |
|---|---|---|---|
| 4,878,240 A | | 10/1989 | Lin et al. |
| 5,559,875 A | * | 9/1996 | Bieselin et al. ........... 379/202.01 |
| 5,844,979 A | * | 12/1998 | Raniere et al. ........... 379/202.01 |
| 6,163,692 A | * | 12/2000 | Chakrabarti et al. ......... 455/416 |
| 6,801,610 B1 | * | 10/2004 | Malik ...................... 379/202.01 |
| 6,885,740 B2 | * | 4/2005 | Ernstrom et al. ......... 379/207.02 |
| 6,898,273 B2 | * | 5/2005 | Ernstrom et al. ......... 379/202.01 |
| 6,920,212 B2 | * | 7/2005 | Stern et al. ............... 379/202.01 |
| 2006/0153352 A1 | | 7/2006 | Schmidt et al. |
| 2006/0256748 A1 | | 11/2006 | Jung et al. |

FOREIGN PATENT DOCUMENTS

CN    1516420 A    7/2004

(Continued)

OTHER PUBLICATIONS

International Search Report issued in corresponding Chinese Patent Application No. PCT/CN2007/070838, Sep. 2007.

(Continued)

*Primary Examiner* — Simon Sing
(74) *Attorney, Agent, or Firm* — Brinks Hofer Gilson & Lione

(57) ABSTRACT

A conference control method includes: an Application Server (AS) sets a digit collection template for the conference session; a Media Resource Server (MRS) detects and collects dialing operations of participants on the conference session according to the digit collection template set by the AS, and reports the digit collection result to the AS; the AS controls the conference according to the received digit collection result. A conference control system includes an AS and an MRS, where the AS is adapted to set a digit collection template for the conference session and send the set digit collection template information to the MRS, and adapted to receive the digit collection result from the MRS and control a conference according to the received digit collection result; the MRS is adapted to detect and collect dialing operations of participants on the conference session according to the digit collection template set by the AS, and send the digit collection result to the AS. The present disclosure provides a flexible conference control method without imposing any special requirement on the user terminal.

18 Claims, 7 Drawing Sheets

FOREIGN PATENT DOCUMENTS

| | | | |
|---|---|---|---|
| CN | 1722670 | A | 1/2006 |
| CN | 1852081 | A | 10/2006 |
| CN | 1852302 | A | 10/2006 |
| CN | 1976293 | A | 6/2007 |
| CN | 100525196 | C | 8/2009 |
| DE | 10138102 | A1 | 2/2003 |
| GB | 2119204 | A | 11/1983 |
| JP | 11098139 | A | 4/1999 |
| WO | WO 01/90839 | A2 | 11/2001 |
| WO | WO 2006/118397 | A1 | 11/2006 |

OTHER PUBLICATIONS

Written Opinion of the International Searching Authority issued in corresponding PCT Patent Application No. PCT/CN2007/070838, mailed Jan. 10, 2008.

Extended European Search Report issued in corresponding European Patent Application No. 07817029.7, mailed Mar. 1, 2010.

Office Action issued in corresponding Chinese Patent Application No. 200610161750.2, mailed Mar. 7, 2008.

* cited by examiner

METHOD AND SYSTEM FOR CONTROLLING A CONFERENCE

CROSS-REFERENCE TO RELATED APPLICATIONS

The present application is a continuation application of PCT/CN2007/070838, filed on Sep. 29, 2007, which claims the priority of Chinese Patent Application No. 200610161750.2 filed on Dec. 19, 2006 with the Chinese Patent Office and titled "Method and System for Controlling a Conference", the contents of which are incorporated herein by reference in their entirety.

FIELD OF THE APPLICATION

The present disclosure relates to Next Generation Network (NGN) technologies, and in particular, to a method and system for controlling a conference.

BACKGROUND OF THE APPLICATION

Web conferencing service is a web-based conference call service, which may be applied to multiple networks. A user may access a web conference via a soft terminal, a telephone set, a Session Initiation Protocol (SIP) hard terminal, or a handset to talk with all other participants of the conference. This provides great convenience for people located in different places to talk. Conference information is displayed in the form of web pages. The conference initiator may control the conference based on web. For example, the conference initiator may invite other people to join the conference, start or stop conference audio recording, set conference background music, or terminate the conference.

However, the web-based conference control method requires a special user terminal. To control a conference, a user must use a web-enabled terminal. This is a great restriction on the usage of the method. For example, when a user uses a non web-enabled telephone terminal and initiates a conference, the user is unable to control the conference based on web via the terminal. This means the prior conference control method is not flexible enough and it imposes certain requirements on the user terminal.

SUMMARY OF THE APPLICATION

A conference control method includes: controlling, by an Application Server (AS), a conference according to a digit collection result reported by a Media Resource Server (MRS), where the digit collection result is obtained by the MRS by detecting and collecting dialing operations of a participant on the conference session according to a digit collection template set by the AS.

A conference control system includes an AS and an MRS, where:

the AS is adapted to set a digit collection template for the conference session and send information of the set digit collection template to the MRS, and adapted to receive a digit collection result from the MRS and control a conference according to the received digit collection result; and the MRS is adapted to detect and collect dialing operations of participants on a conference session according to the digit collection template set by the AS, and report the result of the digit collection to the AS.

In addition, an embodiment of the present disclosure provides an AS and an MRS to support the flexible conference control method.

An AS includes a conference service module and a service platform, where:

the conference service module is adapted to set a digit collection template for the conference session and send information of the set digit collection template to the service platform, and adapted to receive a digit collection result from the service platform and control a conference according to the received digit collection result; and the service platform is adapted to send the received digit collection template information to an MRS and adapted to receive a digit collection result from the MRS and send the received digit collection result to the conference service module.

An MRS includes a dialing detecting module and a transceiving module, where:

the dialing detecting module is adapted to detect dialing operations of participants on a conference session, collect dialing information according to a digit collection template set by an AS, and send a digit collection result to the transceiving module; and the transceiving module is adapted to receive digit collection template information from the AS and send the received digit collection template information to the dialing detecting module, and adapted to receive the digit collection result from the dialing detecting module and report the received digit collection result to the AS.

DETAILED DESCRIPTION

To better explain the objective, technical solution and advantages of the present disclosure, a detailed description of the present disclosure is provided hereinafter with reference to embodiments and accompanying drawings.

The basic idea of the conference control method provided by an embodiment of the present disclosure is: an Application Server (AS) sets a digit collection template for the conference session; a Media Resource Server (MRS) detects dialing operations of participants on the conference session and collects the dialed digits according to the digit collection template set by the AS, and reports the digit collection result to the AS; and the AS controls the conference according to the received digit collection result.

The digit collection template defines rules and policies for the MRS to collect digits, which generally includes the maximum length, minimum length, end of collection key (such as "#"), and inter-digit timeout interval of the collected digits. The MRS collects digits according to the rules and policies defined by the digit collection template.

The conference control may include inviting participants, setting conference background music, starting or stopping conference session audio recording, setting a participant floor, expelling a participant, and listening to conference session operation help information. Different digit collection results (user dialing information) may be preset to represent different operations. For example, 11 stands for inviting participants, 12 stands for setting the conference session background music, 13 stands for starting or stopping conference session audio recording, and 14 stands for listening to conference session operation help information. After the AS receives the digit collection result reported by the MRS, the AS executes an operation corresponding to the received digit collection result according to the service logic.

Figure 1:
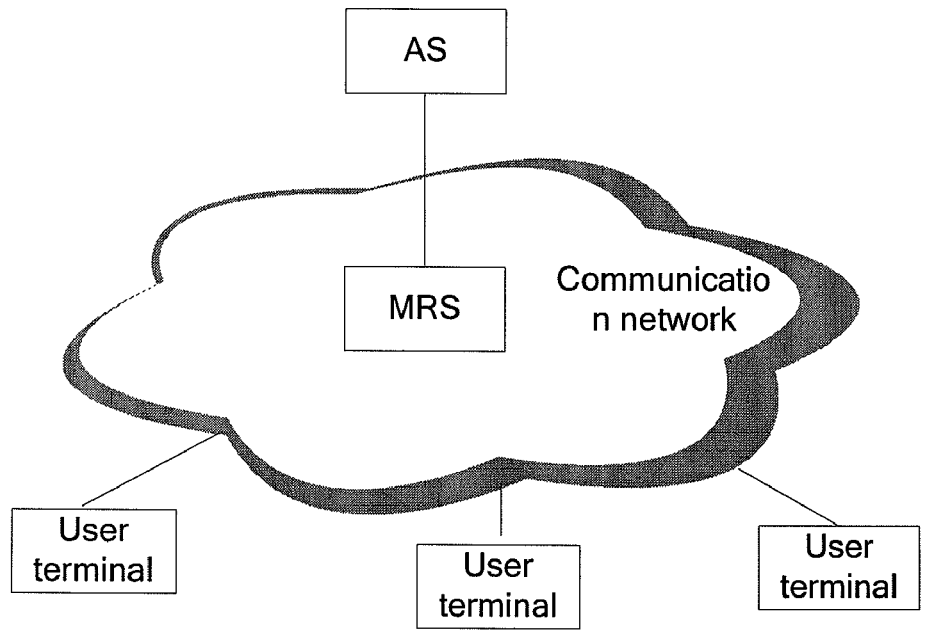
FIG. 1 is a schematic structure diagram of a conference control system in the present disclosure.

In accordance with the conference control method provided by an embodiment of the present disclosure, another embodiment of the present disclosure provides a conference control system. As shown in FIG. 1, the system includes an AS and an MRS. The AS is adapted to set digit collection template for the conference and send the set digit collection template information to the MRS, receive the digit collection result from the MRS and control the conference according to the received digit collection result. The MRS is adapted to detect dialing operations of participants on the conference session and collect the dialed digits according to the digit collection template set by the AS, and send the digit collection result to the AS.

Figure 2:
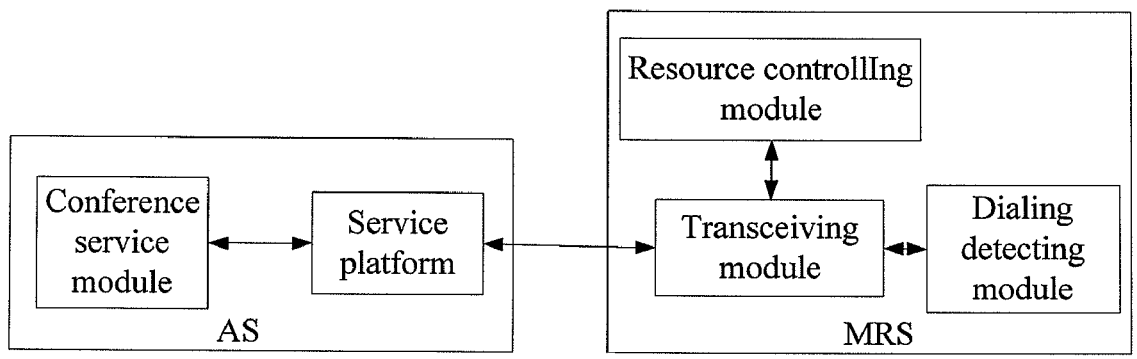
FIG. 2 is a schematic structure diagram of a conference control system according to an embodiment of the present disclosure.

As shown in FIG. 2, the AS includes a conference service module and a service platform. The conference service module is adapted to set collection template for the conference session and send the set digit collection template information to the service platform, receive the digit collection result from the service platform and control the conference according to the digit collection result. The service platform is adapted to send the received digit collection template information to the MRS and receive the digit collection result from the MRS and send the received digit collection result to the conference service module.

In other words, the service platform is adapted to provide the loading and operating environment for the service and communicate with the lower layer network device; and the conference service module is adapted to provide a call execution logic to control a conference call and provide different functions for users.

As shown in FIG. 2, the MRS includes a dialing detecting module and a transceiving module. The dialing detecting module is adapted to detect dialing operations of participants and collect dialing information according to the digit collection template set by the AS and send digit collection result to the transceiving module. The transceiving module is adapted to receive the digit collection template information from the AS and send the received digit collection template information to the dialing detecting module, receive the digit collection result from the dialing detecting module and send the received digit collection result to the AS.

The MRS further includes a resource controlling module. The resource controlling module is adapted to provide special resources for the AS and operate resources according to instruction of the AS and send the operation result to the AS. The instruction of the AS may include such as requesting or releasing a conference session, playing a tone, collecting digits and recording the conference.

In the embodiments of the present disclosure, the AS may communicate with MRS via multiple protocols, such as SIP, H.323, and Media Gateway Control Protocol (MGCP). The description hereinafter assumes that the AS communicates with the MRS via SIP.

The digit collection template for the conference session may be set in the following two modes.

In the first mode, setting digit collection rules for a conference that are applicable to the entire conference session when the conference session is being created, namely setting a default conference session digit connection template for all participants. The default digit collection template is valid to all participants after it is successfully set. The MRS collects digits dialed by all participants during the conference according to the default digit collection template.

In the second mode, setting a digit collection template for a participant when the participant joins the conference instead of setting a default digit collection template for the conference session when the conference session is being created. The MRS collects digits dialed by the participant according to the digit collection template set for the participant.

In the second mode, if no digit collection template is set for a participant when the participant joins the conference, digits dialed by the participant cannot be collected during the conference.

In the first mode, if no other digit collection template is set for a participant when the participant joins the conference, digits dialed by the participant is collected according to the default digit collection template for the conference session; if a new digit collection template is set for the participant, digits dialed by the participant is collected according to the new digit collection template.

In addition, in either the first or the second mode, a new digit collection template for the conference session may be set for a participant after the participant joins the conference. The new digit collection template for conference session may be set many times and the digit collection template set newly overlays the digit collection template set previously. The MRS collects digits dialed by the participant according to the newly set digit collection template during the conference.

As is widely known, a conference call may be initiated in two modes, which are. conference convening and instant conferencing. Conference convening may be a conference that a conference period and required conference resources are preset by a conference scheduler. A conference system reserves the scheduled conference period and the conference resources, assign conference session ID and returns the assigned conference session ID to the conference scheduler. When the preset conference start time arrives, a conference service module creates a conference session according to the preset condition. Participants may dial the conference service access code and enter the conference session ID to join the conference. Instant conferencing may ba a conference initiated instantly by a user called a chair of the conference. The chair is added to the conference session automatically when the conference is created.

Respective processes of setting the default digit collection template for the conference session in the conferences through the two modes of initiating a conference call will be described in detail as follows.

Figure 3:
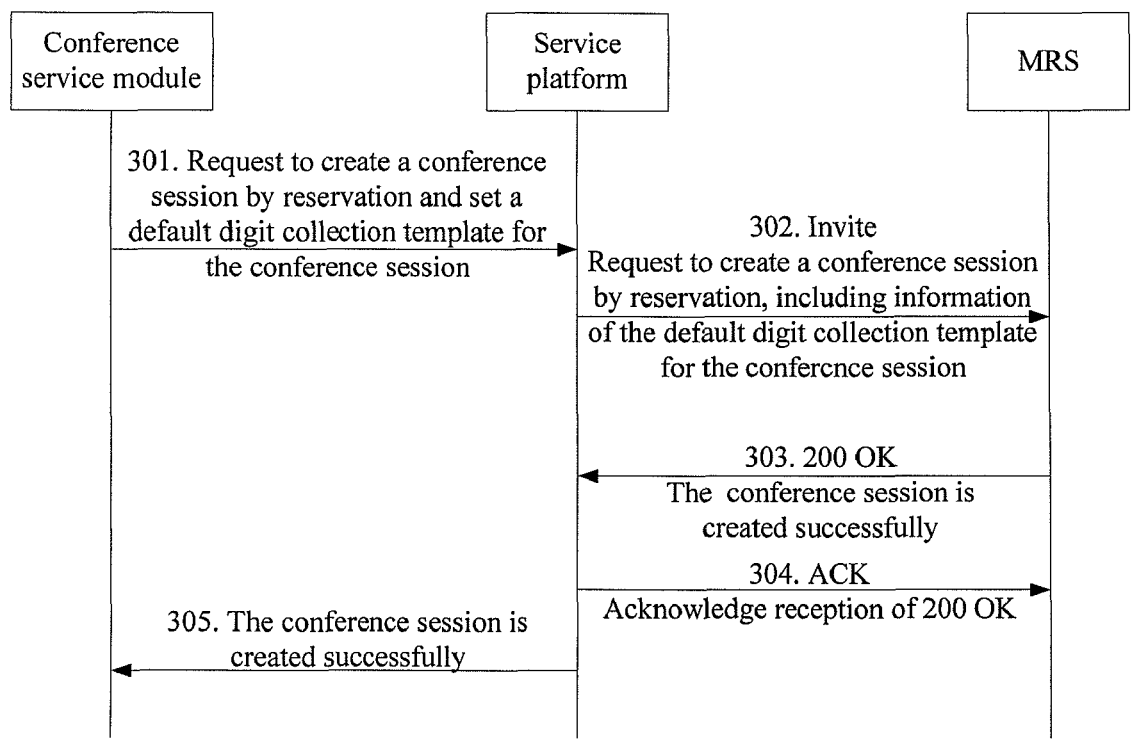
FIG. 3 is a flowchart of setting the default digit collection template for the conference session when a conference call is initiated by means of conference convening according to an embodiment of the present disclosure.

As shown in FIG. 3, when a conference call is initiated by means of conference convening, a method for setting the default digit collection template for the conference session may refer to a method described as follows.

Step 301: The conference service module requests the service platform to create a conference session by means of reservation according to settings of the conference scheduler and sets the default digit collection template for the conference session for all participants.

Step 302: Upon reception of the request of the conference service module, the service platform sends an Invite message to the MRS requesting the MRS to create a conference session by means of reservation. The Uniform Resource Identifier (URI) of the Invite message includes information of the default digit collection template for the conference session set by the conference service module.

Step 303: Upon reception of the Invite message, the MRS creates the conference session and after the conference session is created successfully, the MRS sends a 200 OK message to the service platform to notify the service platform of the successful creation of the conference session.

Step 304: The service platform sends an ACK message to the MRS, acknowledging reception of the 200 OK message.

Step 305: The service platform notifies the conference service module of the successful creation of the conference session.

After the conference session is created successfully, users may dial the conference service access code to access the conference during the reserved conference period.

Figure 4:
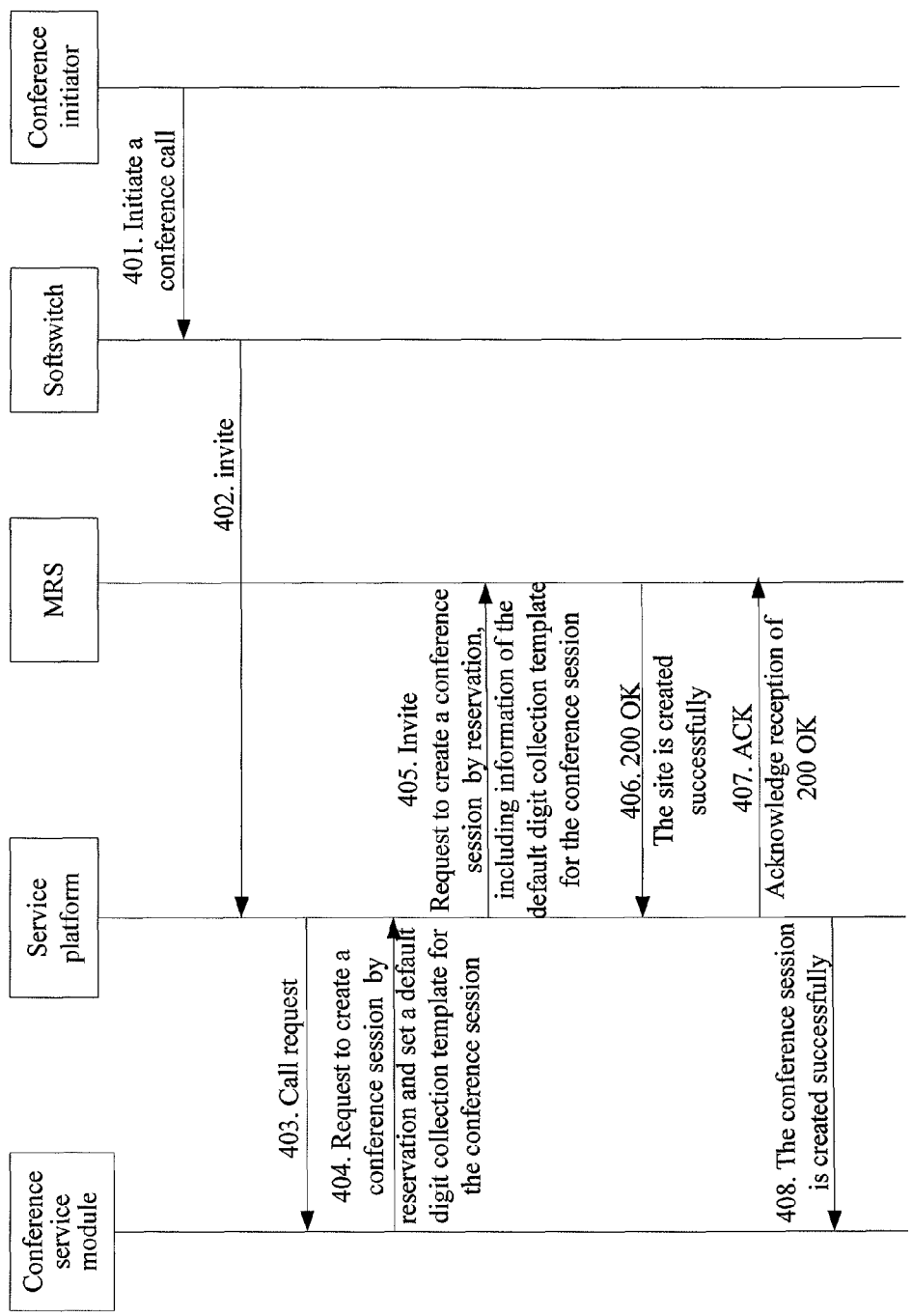
FIG. 4 is a flowchart of setting the default digit collection template for the conference session when a conference call is initiated by means of instant conferencing according to an embodiment of the present disclosure.

As shown in FIG. 4, when a conference call is initiated by means of instant conferencing, a method for setting the default digit collection template for the conference session may refer to a method described as follows.

Step 401: The conference initiator dials a conference service access code initiatively to initiate a conference call.

Step 402: A softswitch triggers the conference service and sends an Invite message to the service platform to report the call request.

In this step, the softswitch is adapted to trigger the conference service, rout, and connect the call and may interact with the AS via SIP signaling. After determining that the call service is triggered, the softswitch forwards the call to the AS for subsequent control. The AS may instruct the softswitch to connect or release the call initiator according to need of the service logic.

Step 403: The service platform reports the call request to the conference service module.

Step 404: The conference service module processes the call request according to the service logic. The conference service module requests the service platform to create a conference session and set a default digit collection template for the conference session for all participants.

Step 405: Upon reception of the request of the conference service module, the service platform sends an Invite message to the MRS, requesting to create a conference session. The URI of the Invite message includes information of the default digit collection template for the conference session set by the conference service module.

Step 406: Upon reception of the Invite message, the MRS creates the conference session and after the conference session is created successfully, the MRS sends a 200 OK message to the service platform to notify the service platform of the successful creation of the conference session.

Step 407: The service platform sends an ACK message to the MRS, acknowledging reception of the 200 OK message.

Step 408: The service platform notifies the conference service module the successful creation of the conference session.

Otherwise, a participant may join a conference in the following two modes.

1. The participant dials the conference service access code to join the conference initiatively.

2. The conference chair invites the participant to join the conference via the conference service module.

The following are respective processes of setting a digit collection template for a participant when the participant is added to the conference session through the two modes.

Figure 5:
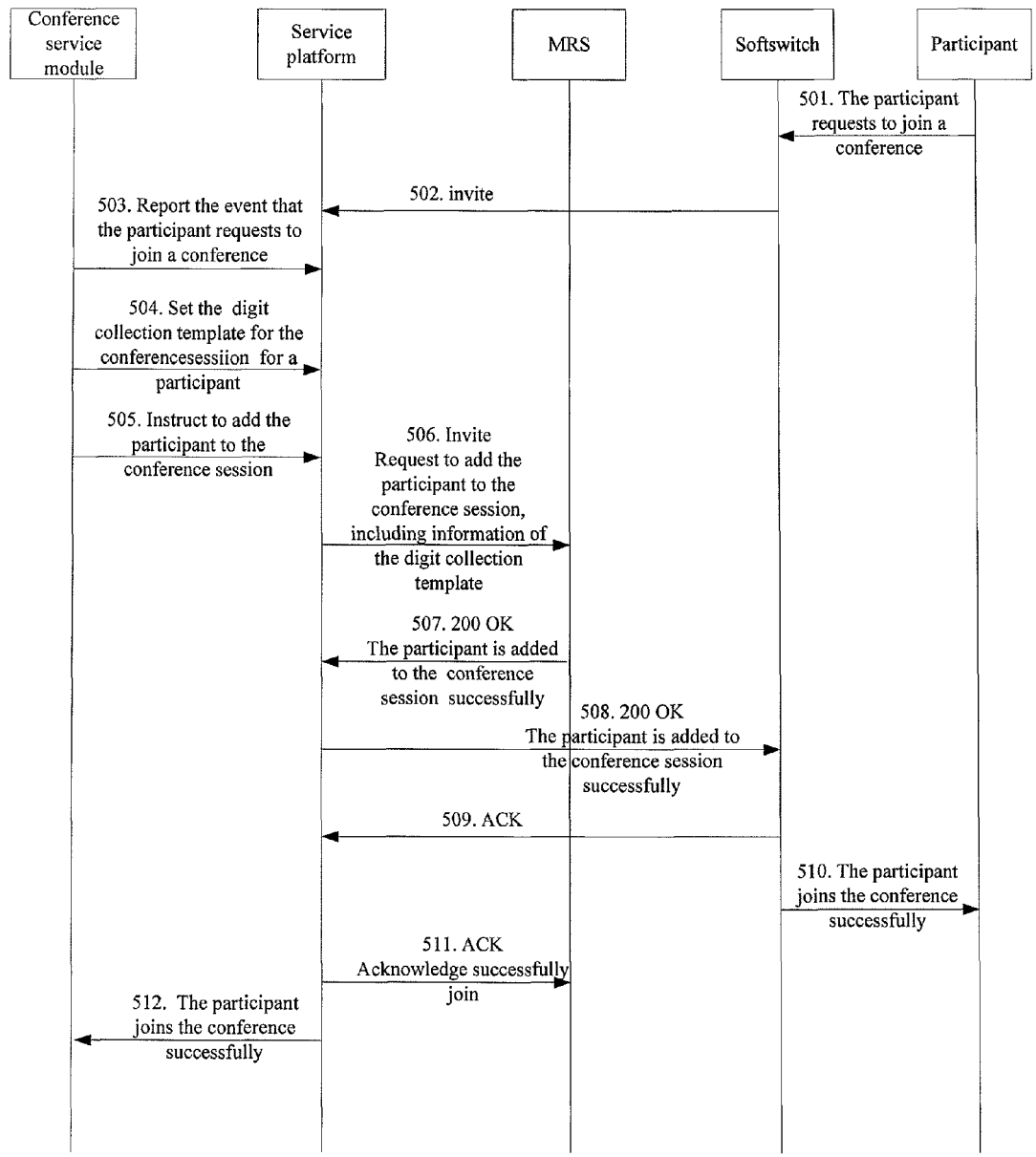
FIG. 5 is a flowchart of setting a digit collection template for a participant when the participant joins a conference initiatively according to an embodiment of the present disclosure.

As shown in FIG. 5, when a participant joins the conference initiatively, a process of setting a digit collection template for the participant may refer to a method described as following.

Step 501: The participant dials the conference service access code, requesting to join the conference.

Step 502: The softswitch sends an Invite message to the service platform, notifying that the participant requests to join the conference.

Step 503: The service platform reports the event that the participant requests to join the conference to the conference service module.

Step 504: Upon reception of the event, the conference service module sets the conference session digit collection module for the participant according to need of the service logic.

Step 505: The conference service module instructs the service platform to add the participant to the conference session.

Step 506: The service platform sends an Invite message to the MRS, requesting to add the participant to the conference session. The URI of the Invite message includes information of the digit collection template for the conference session of the participant.

Step 507: After successfully adding the participant to the conference session, the MRS sends a 200 OK message to the service platform, notifying that the participant is added to the conference session successfully.

Step 508: The service platform sends a 200 OK to the softswitch, notifying that the participant is added to the conference session successfully.

Step 509: The softswitch sends an ACK to the service platform, acknowledging that the 200 OK is received.

Step 510: The softswitch notifies the participant that the participant joins the conference successfully.

Step 511: The service platform sends an ACK to the MRS, acknowledging that the participant joins the conference successfully. The participant may speak and listen to other participants during the conference.

Step 512: The service platform reports the event that the participant joins the conference successfully to the conference service module.

Figure 6:
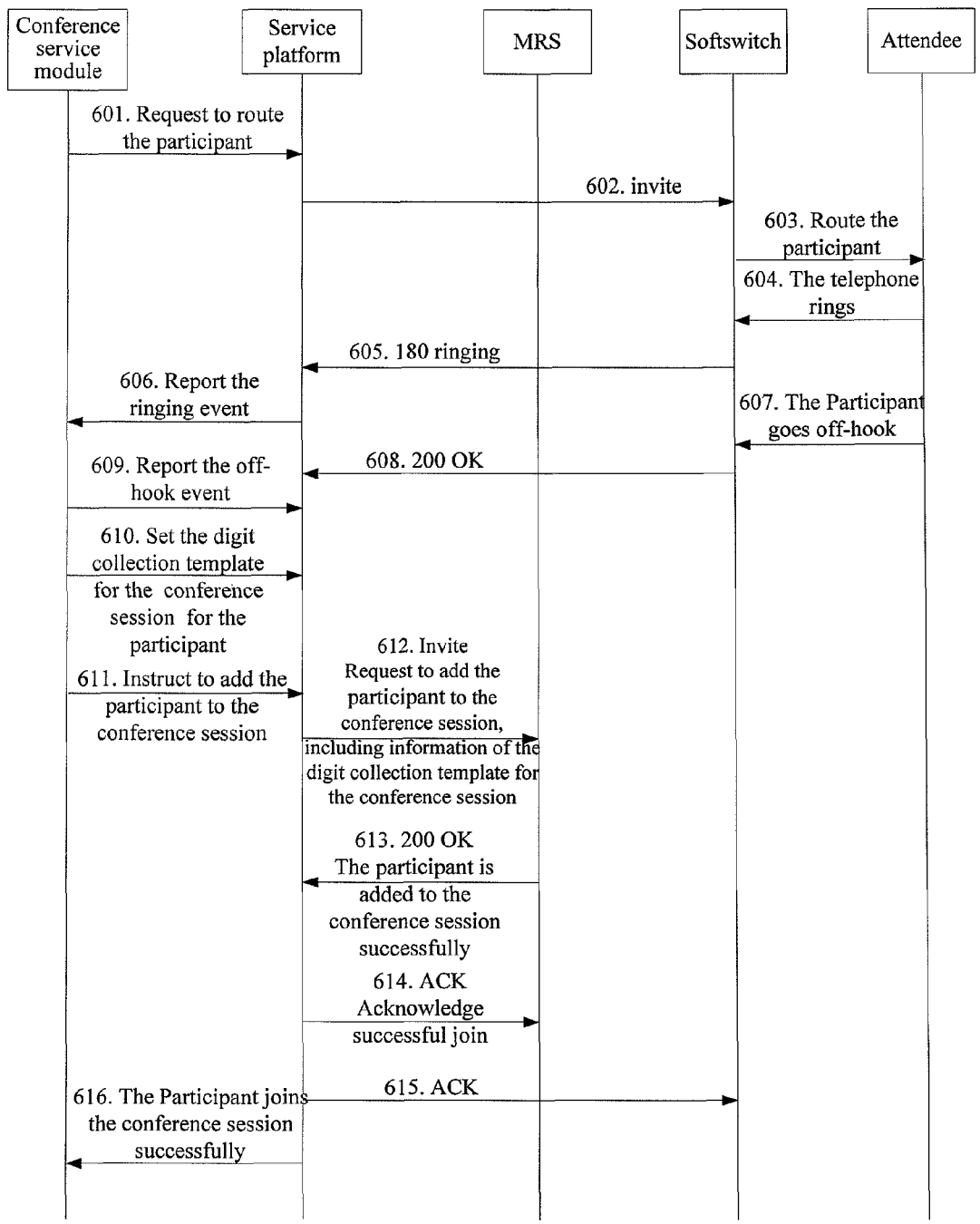
FIG. 6 is a flowchart of setting a digit collection template for a participant when the participant is invited to join a conference according to an embodiment of the present disclosure.

As shown in FIG. 6, when the conference chair invites a participant to join the conference, a process of setting a digit collection template for the participant may as follows.

Step 601: The conference service module requests the service platform to route the participant according to the participant number set by the conference chair.

Step 602: The service platform sends an Invite message to the softswitch, requesting to route the participant corresponding to the participant number.

Step 603: The softswitch initiates a call to the participant.

Step 604: The participant's telephone rings.

Step 605: The softswitch sends a 180 Ringing message to the service platform, notifying that the participant's telephone rings.

Step 606: The service platform reports the ringing event to the conference service module.

Step 607: The participant goes off-hook and answers.

Step 608: The softswitch sends a 200 OK message to the service platform, notifying that the participant goes off-hook.

Step 609: The service platform reports the off-hook event to the conference service module.

Step 610: The conference service module sets the digit collection template for the conference session for the participant.

Step 611: The conference service module instructs the service platform to add the participant to the conference session.

Step 612: The service platform sends an Invite message to the MRS, requesting to add the participant to the conference session. The URI of the Invite message includes information of the digit collection template for the conference session for the participant.

Step 613: After successfully adding the participant to the conference session, the MRS sends a 200 OK message to the service platform, notifying that the participant is added to the conference session successfully.

Step 614: The service platform sends an ACK to the MRS, acknowledging that the participant joins the conference successfully. The participant may speak and listen to other participants during the conference.

Step 615: The service platform sends an ACK to the softswitch, notifying the softswitch that the participant joins the conference successfully.

Step 616: The service platform reports the event that the participant joins the conference successfully to the conference service module.

Figure 7:
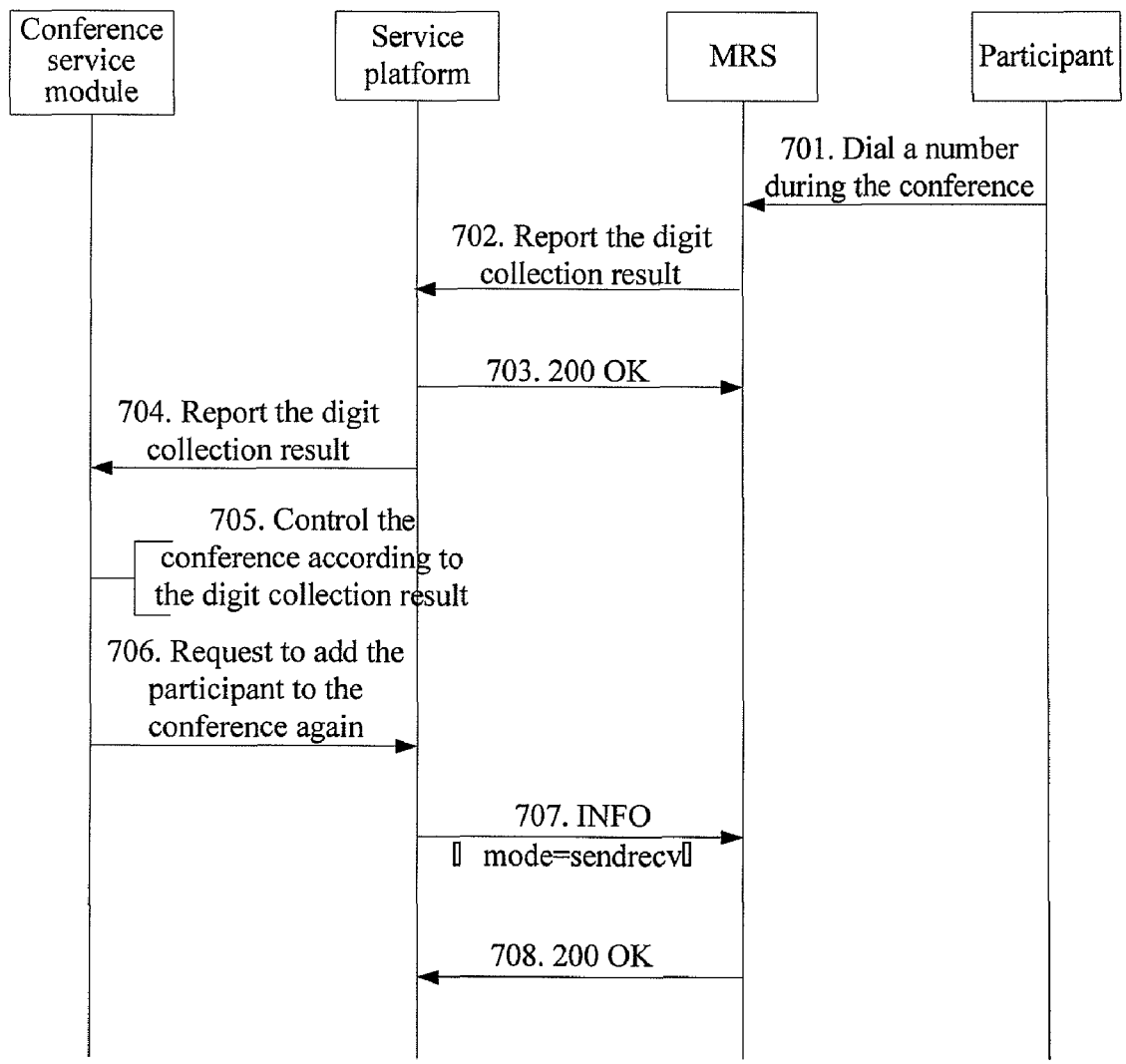
FIG. 7 is a flowchart that an MRS reports digit collection result to an AS according to an embodiment of the present disclosure.

As shown in FIG. 7, the process that the MRS reports the digit collection result to the AS may refer to as follows.

Step 701: A participant dials a number during a conference. The MRS detects the dialing information of the participant and collects dialing information according to the digit collection template corresponding to the participant.

Step 702: After collecting the dialing information, the MRS sends an INFO message to the AS to report the digit collection result. Meanwhile, the MRS isolates the participant from the conference session automatically so that the participant is not included in the mixed audio.

In this step, a participant state controlling module may be set in the MRS, which is adapted to isolate the participant from the conference session.

Step 703: The service platform receives the digit collection result reported by the MRS and sends a 200 OK message to the MRS, acknowledging successful reception of the information.

Step 704: The service platform reports the digit collection result reported by the MRS to the conference service module.

Meanwhile, the service platform changes the state of the participant to Suspend_in_meeting, indicating that the participant is isolated from the conference session. A separate channel control may be performed on the participant, for example, playing a tone or collecting digits using separate channel.

Step 705: Upon reception of the digit collection result reported by the service platform, the conference service module controls the conference according to the received digit collection result. For example, the conference service module plays a tone or collects digits dialed by the participant according to need of the service logic.

Upon reception of the tone playing or digit collection operation from the conference service module, when the service platform finds that the participant state is suspend_in_meeting, the service platform sends directly an INFO message indicating playing tone or digit collection to the MRS without the need to request or negotiate media resources with the MRS.

Step 706: After completing the conference control operation, the conference service module may request the service platform to add the participant to the conference again.

Step 707: The service platform sends an INFO message to the MRS. In the URI of the INFO message, the service platform sets mode=sendrecv is set, instructing the MRS to add the participant to the conference again.

Step 708: Upon reception of the INFO message from the service platform, the MRS adds the participant to the conference again and sends a 200 OK message to the service platform, acknowledging reception of the INFO message.

The participant may be added to the conference again by the participant state controlling module.

Figure 8:
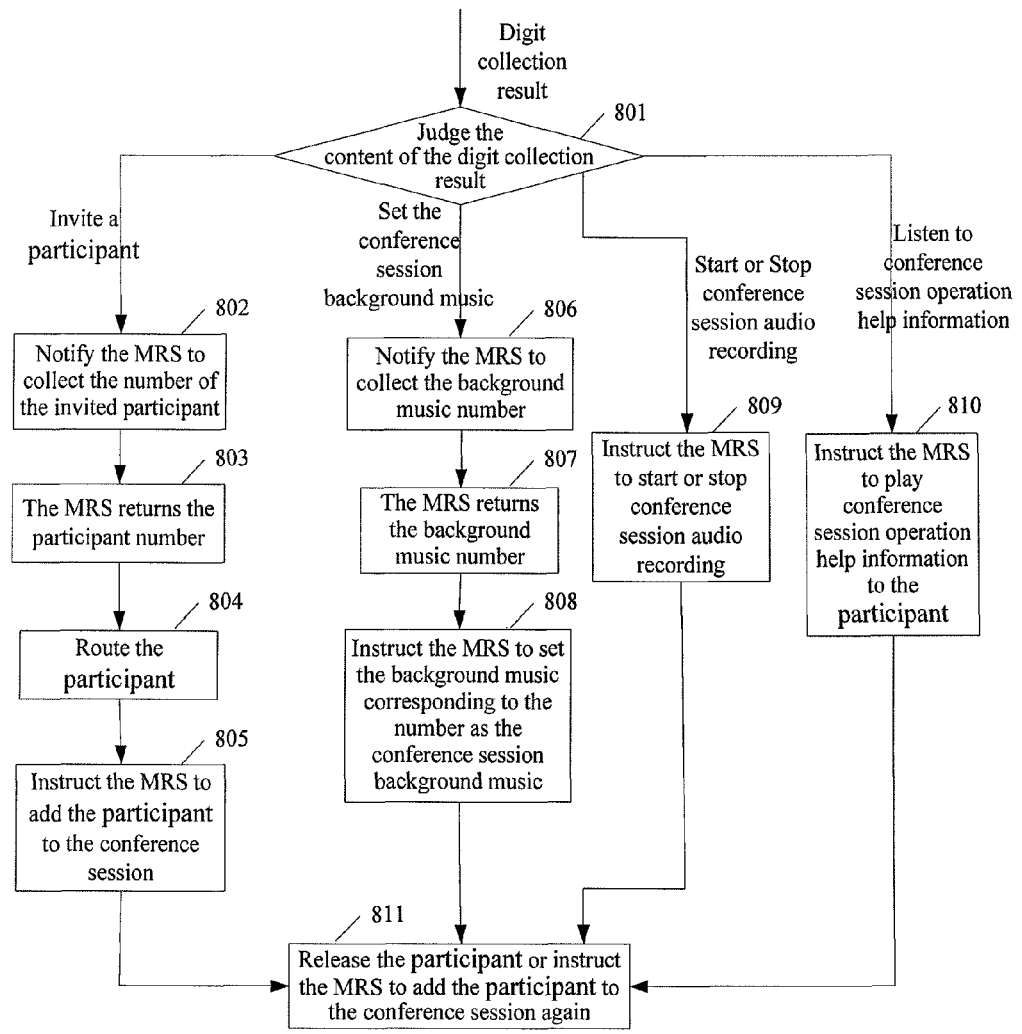
FIG. 8 is a flowchart that an AS controls a conference according to an embodiment of the present disclosure.

As shown in FIG. 8, the process that the AS controls the conference according to the received digit collection result may refer to the following.

Step 801: Upon reception of a digit collection result reported from the MRS, the conference service module judges the content of the digit collection result and executes an operation according to the digit collection result to control and manage the conference session.

The following describes the processing of the AS in detail based on four different digit collection results. Steps 802-805 correspond to a digit collection result that indicates an invitation of a participant. Steps 806-808 correspond to a digit collection result that indicates setting the conference session background music. Step 809 corresponds to a digit collection result that indicates starting or stopping conference session audio recording. Step 810 corresponds to a digit collection result that indicates listening to conference session help information.

Step 802: When the digit collection result indicates the invitation of a participant, the conference service module notifies the MRS to collect number information of the invited participant.

Step 803: Upon reception of the notification to collect the participant number, the MRS instructs (for example, via a voice announcement) the inviter to enter the number of the invited participant and sends the received participant number to the conference service module.

Step 804: The conference service module receives the participant number from the MRS and routes the participant according to the participant number.

Step 805: Upon successful routing, the conference service module instructs the MRS to add the participant to the conference session.

The communication between the MRS and the conference service module is fulfilled via the service platform.

Step 806: When the digit collection result indicates setting the conference session background music, if multiple forms of background music differentiated by numbering exist in the system, the conference service module may notify the MRS to collect the number of the desired background music.

Step 807: The MRS receives the notification to collect the background music number and prompts the user initiating the dialing to enter the background music number, and sends the received background music number to the conference service module.

Step 808: The conference service module receives the background music number from the MRS and instructs the MRS to set the background music corresponding to the number as the conference session background music.

If only one piece of background music exists in the system, the conference service module directly instructs the MRS to set the one piece of background music as the conference session background music upon reception of the digit collection result that indicates setting the conference session background music, without the need to notify the MRS to collect the background music number.

Step 809: When the digit collection result indicates starting or stopping conference session audio recording, the conference service module instructs the MRS to start or stop conference session audio recording.

Step 810: When the digit collection result indicates listening to conference session operation help information, the conference service module instructs the MRS to play the conference session help information to the participant that initiates the dialing.

Step 811: After the operation requested by the participant that initiates the dialing is completed, the conference service module may release the participant or instruct the MRS to add the participant to the conference session again according to actual need.

Although the objective, technical solution and benefits of the present disclosure have been described in detail through exemplary embodiments, the present disclosure is not limited to such embodiments. It is apparent that those skilled in the art can make various modifications and variations the present disclosure without departing from the spirit and scope of the claims. The claims are intended to cover the modifications and variations provided that they fall in the scope of protection defined by the claims or their equivalents.

What is claimed is:

1. A conference control method, comprising:
controlling, by an Application Server (AS), a conference session according to a digit collection result reported by a Media Resource Server (MRS), wherein the digit collection result is obtained by the MRS by detecting and collecting dialing operations of a participant on the conference session according to a digit collection template set by the AS, wherein the digit collection template is a default digit collection template for the conference session set by the AS when the conference session is created; and the MRS detects and collects dialing operations of all participants on the conference session according to the default digit collection template for the conference session;
setting, by the AS, a new digit collection template for the conference session for a participant when the participant is joining the conference or after the participant joins the conference; so that the MRS detects and collects dialing operations of the participant during the conference session according to the new digit collection template for the conference session after the new digit collection template for the conference session is set.

2. The method of claim 1, wherein a process of setting the default digit collection template for the conference session comprises:
requesting, by the AS, the MRS to create the conference session by means of a reservation according to settings of a conference scheduler;
setting, by the AS, the default digit collection template for the conference session for all participants; and
sending, by the AS, information of the set default digit collection template for the conference session to the MRS.

3. The method of claim 1, wherein a process of setting the default digit collection template for the conference session comprises:
requesting, by the AS, the MRS to create the conference session upon reception of a call request from a conference initiator;
setting, by the AS, the default digit collection template for the conference session for all participants; and
sending, by the AS, information of the set default digit collection template for the conference session to the MRS.

4. The method of claim 1, wherein the digit collection result indicates an invitation of a participant, and a process of controlling the conference session by the AS according to the digit collection result reported by the MRS comprises:
notifying, by the AS, the MRS to collect number information of an invited participant, so that the MRS collects the number of the invited participant upon reception of the notification and sends the collected participant number to the AS; and
routing, by the AS, the participant according the received participant number and instructing the MRS to add the participant to the conference session after the routing is successful.

5. The method of claim 1, wherein the digit collection result indicates setting of conference session background music, and a process of controlling the conference session by the AS according to the digit collection result reported by the MRS comprises:
instructing, by the AS, the MRS to set an only piece of background music existing on the conference session as the conference session background music; or
notifying, by the AS, the MRS to collect the number of background music to set, so that the MRS collects the background music number upon reception of the notification and sends the collected background music number to the AS; and
instructing, by the AS, the MRS to set the background music corresponding to the number as the conference session background music after collecting the background music number.

6. The method of claim 1, wherein the digit collection result indicates a starting or stopping of audio recording of the conference session, and a process of controlling the conference session by the AS according to the digit collection result reported by the MRS comprises: instructing, by the AS, the MRS to start or stop the audio recording of the conference session audio.

7. The method of claim 1, wherein the digit collection result indicates listening to conference session operation help information, and a process of controlling the conference session by the AS according to the digit collection result reported by the MRS comprises:
instructing, by the AS, the MRS to play conference session operation help information to the participant that initiates the dialing.

8. The method of claim 1, wherein after the digit collection results are reported by the MRS, the method further comprises:
isolating, by the MRS, the participant from the conference session.

9. The method of claim 8, wherein after the AS controls the conference session according to the digit collection result reported by the MRS, the method further comprises:
releasing, by the AS, the participant or instructing, by the AS, the MRS to add the participant to the conference session again.

10. A conference control method, comprising:
controlling, by an Application Server (AS), a conference session according to a digit collection result reported by a Media Resource Server (MRS), wherein the digit collection result is obtained by the MRS by detecting and collecting dialing operations of a participant on the conference session according to a digit collection template set by the AS, wherein: the digit collection template is set by the AS for a participant when the participant joins the conference session; and the MRS detects and collects dialing operations of the participant during the conference session according to the digit collection template for the conference session set by the AS for the participant; the participant joins the conference session initiatively and a process of setting the digit collection template for the conference session comprises:

requesting, by the AS, the MRS to add the participant to the conference session upon reception of a join request from the participant; setting, by the AS, the digit collection template for the conference session for the participant; and sending, by the AS, information of the digit collection template for the conference session set for the participant to the MRS.

11. The method of claim 10, wherein the participant is invited to join the conference and a process of setting the digit collection template for the conference session comprises:

requesting, by the AS, the MRS to add the participant to the conference session upon reception of an off-hook event of the invited participant;

setting, by the AS, the digit collection template for the conference session for the participant; and sending, by the AS, information of the digit collection template for the conference session set for the participant to the MRS.

12. The method of claims 10, further comprising:

setting, by the AS, a new digit collection template for the conference session for the participant after the participant joins the conference session; so that the MRS detects and collects dialing operations of the participant during the conference according to the new digit collection template for the conference session after the new digit collection template for the conference session is set.

13. A conference control system, comprising:

an Application Server (AS); and a Media Resource Server (MRS), wherein the AS is configured to set a digit collection template for the conference session, send information of the set digit collection template to the MRS, receive a digit collection result from the MRS and control a conference session according to the received digit collection result; the digit collection template is a default digit collection template for the conference session set by the AS when the conference session is created; and set a new digit collection template for the conference session for a participant when the participant is joining the conference or after the participant joins the conference; and the MRS is configured to detect and collect dialing operations of participants on a conference session according to the digit collection template set by the AS, detect and collect dialing operations of all participants on the conference session according to the default digit collection template for the conference session; and detect and collect dialing operations of the participant during the conference session according to the new digit collection template for the conference session after the new digit collection template for the conference session is set.

14. An Application Server (AS), comprising:

a conference service module;

a service platform, and a module wherein, the conference service module is configured to set a digit collection template for the conference session, send information of the set digit collection template to the service platform, receive a digit collection result from the service platform and control a conference session according to the received digit collection result; the digit collection template is a default digit collection template for the conference session set by the AS when the conference session is created so that a Media Resource Server (MRS) detects and collects dialing operations of all participants on the conference session according to the default digit collection template for the conference session; and the service platform is configured to send the received digit collection template information to the MRS, receive a digit collection result from the MRS and send the received digit collection result to the conference service module;

the module is configured to set a new digit collection template for the conference session for a participant when the participant is joining the conference or after the participant joins the conference; so that the MRS detects and collects dialing operations of the participant during the conference session according to the new digit collection template for the conference session after the new digit collection template for the conference session is set.

15. A Media Resource Server (MRS), comprising:

a dialing detecting module;

a transceiving module, a first module, and a second module;

wherein, the dialing detecting module is configured to detect dialing operations of participants of a conference session, collect dialing information according to a digit collection template set by an Application Server (AS), and send a digit collection result to the transceiving module, the digit collection template is a default digit collection template for the conference session set by the AS when the conference session is created; and the transceiving module is configured to receive digit collection template information from the AS, send the received digit collection template information to the dialing detecting module, receive the digit collection result from the dialing detecting module and report the received digit collection result to the AS;

the first module is configured to detect and collect dialing operations of all participants on the conference session according to the default digit collection template for the conference session;

the second module is configured to detect and collect dialing operations of the participant during the conference session according to a new digit collection template for the conference session after the new digit collection template for the conference session is set wherein the new digit collection template for the conference session for a participant when the participant is joining the conference or after the participant joins the conference; so that the MRS.

16. The MRS of claim 15, further comprising a resource controlling module configured to provide resources for the AS, operate resources according to an instruction of the AS, and report an operation result to the AS.

17. The system of claim 15, wherein the MRS further comprises a participant state controlling module, the participant state controlling module is configured to isolate a participant from the conference session and add the isolated participant to the conference session again.

18. A conference control method, comprising:

controlling, by an Application Server (AS), a conference session according to a digit collection result reported by a Media Resource Server (MRS), wherein the digit collection result is obtained by the MRS by detecting and collecting dialing operations of a participant on the conference session according to a digit collection template set by the AS;

wherein the digit collection result indicates setting of conference session background music, and a process of controlling the conference session by the AS according to the digit collection result reported by the MRS comprises:

instructing, by the AS, the MRS to set an only piece of background music existing on the conference session as the conference session background music; or notifying, by the AS, the MRS to collect the number of background music to set, so that the MRS collects the background music number upon reception of the notification and sends the collected background music number to the AS; and instructing, by the AS, the MRS to set the background music corresponding to the number as the conference session background music after collecting the background music number.

* * * * *